US012006737B2

(12) United States Patent
Wong

(10) Patent No.: US 12,006,737 B2
(45) Date of Patent: Jun. 11, 2024

(54) CHAIN LOCK

(71) Applicant: ABUS August Bremicker Söhne KG, Wetter-Volmarstein (DE)

(72) Inventor: Kenneth Wong, Shatin (HK)

(73) Assignee: ABUS August Bremicker Sohne KG, Wetter-Volmarstein (DE)

( * ) Notice: Subject to any disclaimer, the term of this patent is extended or adjusted under 35 U.S.C. 154(b) by 361 days.

(21) Appl. No.: 17/346,840

(22) Filed: Jun. 14, 2021

(65) Prior Publication Data

US 2021/0388644 A1 Dec. 16, 2021

(30) Foreign Application Priority Data

Jun. 15, 2020 (DE) ......................... 102020115761.4

(51) Int. Cl.
*E05B 73/00* (2006.01)
*E05B 15/16* (2006.01)
*E05B 37/00* (2006.01)
*E05B 37/02* (2006.01)

(52) U.S. Cl.
CPC ...... *E05B 73/0005* (2013.01); *E05B 15/1614* (2013.01); *E05B 37/0058* (2013.01); *E05B 37/02* (2013.01)

(58) Field of Classification Search
CPC .. E05B 73/00; E05B 73/0005; E05B 37/0058; E05B 37/02; E05B 15/1614; Y10T 70/435; Y10T 70/483; Y10T 70/7305
USPC ............................................... 70/30, 49, 312
See application file for complete search history.

(56) References Cited

U.S. PATENT DOCUMENTS 504,034 A * 8/1893 Hay ...................... E05B 37/025 70/25
3,999,408 A * 12/1976 Kawakami .............. E05B 37/10 70/30
4,302,955 A * 12/1981 Kawakami .............. E05B 37/08 70/30
D274,125 S * 6/1984 Hardesty ......................... D8/340
4,615,191 A * 10/1986 Grandy ................... E05B 37/02 403/328
(Continued)

FOREIGN PATENT DOCUMENTS

CN 101048561 A * 10/2007 ......... E05B 73/0082
CN 107178260 A * 9/2017 ............. B62H 5/003
(Continued)

*Primary Examiner* — Suzanne L Barrett
(74) *Attorney, Agent, or Firm* — Dinsmore & Shohl LLP

(57) ABSTRACT

A chain lock includes a lock body having a first closure part, a second closure part, and a combination locking mechanism that is aligned along a lock axis. The chain lock having a bolt selectively locked to the lock body by the combination locking mechanism. The lock body has a chain connection part permanently connected to the bolt via a chain. The combination locking mechanism having a plurality of rotatable code setting rings arranged between the first and second closure parts. At a first end the lock body has at least one first fastening pin that engages through the housing sleeve into an annular groove of the chain connection part. At a second end the lock body has at least one second fastening pin that engages through the housing sleeve into the second closure part of the lock body and that fixes the second closure part to the housing sleeve.

14 Claims, 9 Drawing Sheets

(56) References Cited

U.S. PATENT DOCUMENTS

| | | | | | |
|---|---|---|---|---|---|
| 5,027,623 | A * | 7/1991 | Ling | E05B 67/003 70/318 |
| 5,636,539 | A * | 6/1997 | Tsai | E05B 37/02 70/315 |
| 5,749,251 | A * | 5/1998 | Keefe | A63C 11/007 70/30 |
| 5,899,099 | A * | 5/1999 | Tsai | E05B 67/003 70/30 |
| 6,209,368 | B1 * | 4/2001 | Lee | E05B 37/025 70/315 |
| 6,305,197 | B1 * | 10/2001 | Ling | E05B 73/0005 70/30 |
| 6,386,005 | B1 * | 5/2002 | Kuo | E05B 37/025 70/30 |
| 6,711,922 | B1 | 3/2004 | Cheng-Tao | |
| 6,845,643 | B2 * | 1/2005 | Tsai | E05B 37/0031 70/315 |
| 6,860,126 | B2 * | 3/2005 | Ling | E05B 37/025 70/52 |
| 7,337,637 | B2 * | 3/2008 | Kan | E05B 37/025 70/318 |
| D688,114 | S * | 8/2013 | Stevens | D8/343 |
| D689,358 | S * | 9/2013 | Stevens | D8/343 |
| 9,267,312 | B2 * | 2/2016 | Zuraski | E05B 37/0048 |
| 9,562,369 | B2 * | 2/2017 | Kuo | E05B 37/0048 |
| 2007/0068200 | A1 * | 3/2007 | Roloff | E05B 37/025 70/30 |
| 2017/0030113 | A1 * | 2/2017 | Edell | E05B 37/025 |

FOREIGN PATENT DOCUMENTS

| | | | | |
|---|---|---|---|---|
| DE | 29917309 | U1 | 2/2000 | |
| DE | 20301113 | U1 | 4/2003 | |
| DE | 102006057759 | A1 * | 6/2008 | E05B 37/025 |
| DE | 102009039156 | A1 | 3/2011 | |
| DE | 102010013400 | A1 | 10/2011 | |
| DE | 102010025383 | A1 | 12/2011 | |
| DE | 202016000005 | U1 | 2/2016 | |
| DE | 102017008236 | B3 * | 10/2018 | |
| EP | 2431949 | A1 * | 3/2012 | G07C 9/0069 |

* cited by examiner

CHAIN LOCK

CROSS-REFERENCE TO RELATED APPLICATIONS

The present disclosure claims priority to German Patent Application No. DE 102020115761.4 filed Jun. 15, 2020, the contents of which are incorporated by reference herein.

TECHNICAL FIELD

The present disclosure relates to a chain lock comprising a lock body, which has a combination locking mechanism that is aligned along a lock axis, and comprising a bolt that has a bolt mandrel, which may be introduced into the lock body, and that may be selectively locked to the lock body by the combination locking mechanism. In addition, the lock body has a chain connection part that is permanently connected to a chain and via the chain to the bolt, wherein the chain connection part and the bolt are aligned coaxially to one another in a locked state of the bolt.

BACKGROUND

Such chain locks may, for example, serve to secure two-wheelers, in particular bicycles, against theft or an unauthorized riding away. For this purpose, the chain may be led around a section of the two-wheeler, for example a frame section, and around a stationary object, such as a bicycle stand, a fence, or a lamppost, such that the loop formed by the locking of the bolt to the lock body securely fixes the two-wheeler to the stationary object. Furthermore, a two-wheeler may be secured by a chain lock by leading the chain around a frame section and through one of the wheels of the two-wheeler such that the loop formed by the chain lock blocks a rotation of the wheel and thus prevents an unauthorized riding away with the two-wheeler. To lock the bolt to the lock body, a sequence of numbers may, for example, be settable as a secret code by the combination locking mechanism, wherein the bolt mandrel introduced into the lock body can be blocked against a removal from the lock body by disarranging the secret code.

Due to the flexibility of the chain and the easy adaptability of the shape of the loop formed, the securing of two-wheelers to a stationary object may be made possible by chain locks in a variety of situations. Since the chain connection part and the bolt are aligned coaxially to one another in a locked state of the bolt, a large circumference may be engaged around with a given chain length without this being made more difficult or prevented, for instance by a kink in the loop formed (e.g. due to an angled lock body). Thus, a connection of the two-wheeler to a stationary object may, for example, also take place at trees having a larger diameter, whereby the two-wheeler may be secured against a removal and a leading away.

Such chain locks are, for example, shown in DE 10 2009 039 156 A1 (but with a cylinder lock and a laterally fastened chain end) and DE 10 2010 025 383 A1 (with a coaxial alignment of the two ends, but with a cylinder lock). A permutation lock comprising a combination locking mechanism is known from DE 10 2010 013 400 A1.

While such chain locks thus offer a comfortable possibility of securing two-wheelers, there is generally the problem that chain locks may be subjected to relatively high tensile stresses during break-open attempts. By pulling at the ends of the chain facing the bolt or the chain connection part, high forces may be applied and may be transmitted to the lock body such that a stable design of the lock body is required to be able to withstand these loads and prevent a forced tearing out of the bolt mandrel and/or of the chain connection part from the lock body. At the same time, the design of the chain lock with a combination locking mechanism may, however, require components of a relatively complex structure for arranging the components of the combination locking mechanism, wherein the manufacture of such complex components from sufficiently stable materials may be undesirably expensive.

It is an object of the present disclosure to provide a chain lock that enables a simple and inexpensive manufacture and provides a high resistance with respect to break-open attempts.

SUMMARY

This object is satisfied by a chain lock of the present disclosure.

The lock body has a first closure part and a second closure part, wherein the combination locking mechanism has a plurality of rotatable code setting rings that are arranged between the first closure part and the second closure part of the lock body, and wherein the lock body comprises a housing sleeve that has an access window via which the code setting rings are accessible for a manual rotation. The lock body has, at a first end associated with the chain connection part (e.g. facing the chain connection part), at least one first fastening pin that engages through the housing sleeve into an annular groove of the chain connection part such that the chain connection part is rotatably supported at the housing sleeve. The lock body has, at a second end associated with the bolt (e.g. facing the bolt in a locked state of the bolt), at least one second fastening pin that engages through the housing sleeve into the second closure part of the lock body and that fixes the second closure part to the housing sleeve.

The code setting rings may serve to selectively set or disarrange a secret code by rotating about an axis of rotation, in particular about the lock axis or about an axis of rotation in parallel with the lock axis, wherein the bolt mandrel introduced into the lock body may only be removed from the lock body when the secret code is set. In contrast, the bolt mandrel may be securely locked in the lock body if a combination deviating from the secret code is set at the code setting rings. For example, the code setting rings may have a plurality of numbers at their outer sides such that a combination of numbers may be settable as a secret code. Alternatively or additionally, shape combinations and/or color combinations may be settable, for example.

The housing sleeve may serve to receive the combination locking mechanism and in particular the code setting rings such that the housing sleeve may surround the code setting rings and protect the code setting rings arranged within the housing sleeve against manipulations or external access. The access window may be formed as an opening in the housing sleeve through which the code setting rings are accessible for a rotation and through which a set combination may be visible. The housing sleeve may in particular be made from a stable material to be able to reliably protect the combination locking mechanism received in the housing sleeve with respect to external force effects, for example in the course of break-open attempts. The housing sleeve may, for example, be substantially hollow cylindrical. However, other cross-sectional shapes are generally also possible; what is important is the stable connection along the lock axis between the first fastening pin(s) and the second fastening pin(s).

Since the at least one first fastening pin engages through the housing sleeve into the annular groove of the chain connection part such that the chain connection part is rotatably supported at the housing sleeve, the chain connection part is connected to the housing sleeve via the at least one first fastening pin and is at least not solely fastened to the first closure part. The chain connection part may in particular be aligned centrally with respect to the first closure part and may extend along the lock axis away from the first end of the lock body such that the at least one first fastening pin may engage from radially outward through the housing sleeve into the annular groove of the chain connection part. The first closure part may also be fixed to the housing sleeve via the at least one first fastening pin, wherein the first closure part may be arranged at the first end of the lock body within the housing sleeve and/or may close the housing sleeve at the first end of the lock body. For example, the housing sleeve and the first closure part may have mutually aligned fastening openings through which the at least one first fastening pin engages.

The chain connection part may in particular be arranged coaxially to the lock axis or to an axis of rotation of the code setting rings and may be rotatably supported about them such that the lock body and the housing sleeve with the code setting rings may also be rotatable about the axis of rotation relative to the chain connection part and to the end of the chain fastened thereto. For example, the access window may thereby be flexibly rotated into a field of view of the user of the chain lock when the bolt mandrel is locked such that the user may set and check a combination by the code setting rings.

The second end of the lock body associated with the bolt may in particular be arranged opposite the first end of the lock body with respect to the lock axis. Accordingly, the second closure part may also be arranged opposite the first closure part with respect to the lock axis. The second closure part may be arranged at the second end of the lock body within the housing sleeve and the at least one second fastening pin may extend through fastening openings of the housing sleeve and of the second closure part to fix the second closure part to the housing sleeve. The first closure part and the second closure part may close the housing sleeve at both ends of the lock body, wherein the second closure part may, however, have an introduction opening for the bolt mandrel.

The first fastening pin(s) and the second fastening pin(s) are generally elongate fastening elements. The fastening pins may be cylindrical. However, the fastening pins may also be configured as rivets or screws. The fastening pins may be connected to the respective installation environment (e.g. housing sleeve) by force fit and/or by form fit (for instance due to a plastic deformation).

Since the chain connection part is thus connected to the housing sleeve via the at least one first fastening pin and the housing sleeve is connected to the second closure part via the at least one second fastening pin, tensile forces (i.e. pulling forces) applied via the first end and/or the second end of the lock body or via the chain connection part and/or the bolt may be conducted past the first closure part. Consequently, a force flow leads from the chain connection part at the lock body side via the at least one first fastening pin, the housing sleeve, and the at least one second fastening pin to the second closure part without the first closure part being substantially loaded by the tensile forces. The second closure part may in particular support the code setting rings at which the locked bolt mandrel may engage. Conversely, a force flow may thus also lead from the bolt via the code setting rings to the second closure part and from the latter via the at least one second fastening pin, the housing sleeve, and the at least one first fastening pin to the chain connection part such that the first closure part does not experience a substantial load.

This conducting of the force flow past the first closure part may in particular make it possible or make it simpler to provide the first closure part with the required shape—for example, in order to rotatably support the code setting rings—since the required tensile stability may be ensured by the housing sleeve, the fastening pins, and the second closure part. The first closure part may thereby, for example, be formed with a relatively complex shape without problem, in a quick and easily reproducible manner, in particular to be able to act as a base body of the lock body for arranging the combination locking mechanism or for lining up the code setting rings. The housing sleeve and the second closure part may, in contrast, be formed with simple geometric shapes such that their production from stable materials may take place with little effort. For example, the housing sleeve may be hollow cylindrical, partly surrounding the code setting rings, with respective openings which are opposite one another with respect to the lock axis and through which the combination locking mechanism may be insertable. The second closure part may further form a cover for the opening of the housing sleeve at the second end of the lock body to fix the code setting rings in the housing sleeve and thus to have a shape that is likewise simple and that may also be produced without problem from stable materials.

Further embodiments are explained in the description and in the drawings.

In some embodiments, the housing sleeve may be made from steel. Alternatively or additionally, the housing sleeve may be hollow cylindrical. The housing sleeve may in particular be aligned coaxially to the lock axis and/or to an axis of rotation of the code setting rings.

A housing sleeve made from steel may ensure a reliable load capacity of the chain lock with respect to tensile loads, wherein forces acting axially with respect to the lock axis may be conducted to the housing sleeve via the at least one first fastening pin, the at least one second fastening pin, and the second closure part. A hollow cylindrical design of the housing sleeve enables a simple and thereby inexpensive manufacture, wherein only the access window has to be formed as an opening in the housing sleeve that is tubular in such embodiments. Furthermore, such a hollow cylindrical housing sleeve may enable a simple assembly of the chain lock in that the combination locking mechanism or the code setting rings may be introduced, in particular with an exact fit, into the housing sleeve through a respective opening of the housing sleeve at the first end and/or the second end of the lock body. The closure parts may serve to axially close the housing sleeve at both sides with respect to the lock axis and thereby in particular to axially fix the combination locking mechanism.

In some embodiments, the first closure part of the lock body may be made from a zinc die casting. Such a manufacture of the first closure part may in particular enable an inexpensive and fast manufacture thereof also with a relatively complex shape that may be precisely reproducible for a high number of chain locks due to the use of casting molds. Due to the design of the chain lock with a simply formed stable housing sleeve, with a stable second closure part for absorbing tensile loads, which closes the housing sleeve and which acts as a cover, and with a first closure part made from a zinc die casting, all of these parts of the lock body may consequently be manufactured quickly and inexpensively. A first closure part made from a zinc die casting may in particular be formed with a shape that, for example, enables a lining up and support of the code setting rings in order to act as a base body of the lock body.

In some embodiments, provision may be made that the first closure part of the lock body forms a base body that has a bearing prolongation which is aligned along a lock axis and at which the code setting rings are rotatably supported. The bearing prolongation may in particular extend along the lock axis and may be aligned coaxially to an axis of rotation of the code setting rings that may in particular be lined up coaxially to the bearing prolongation. The bearing prolongation may in particular be arcuate in cross-section such that the code setting rings may be rotatable around the bearing prolongation.

The design of the first closure part as a base body of the lock body may in particular enable a simple assembly of the chain lock and in particular of the combination locking mechanism. For this purpose, the code setting rings and other components of the combination locking mechanism may, for example, first be arranged and correctly positioned at the bearing prolongation of the first closure part, whereupon the code setting rings lined up on the bearing prolongation may be pushed into the housing sleeve together with the first closure part, wherein the first closure part may close the housing sleeve at the first end of the lock body in the assembled state. Thereupon, the chain connection part may be fixed to the first closure part in a rotatably supported manner via the at least one first fastening pin led through the housing sleeve, wherein the first closure part may in particular also be fixed to the housing sleeve by the at least one first fastening pin.

The second closure part may, before or after the steps described above, be fixed to the housing sleeve via the at least one second fastening pin and may close the housing sleeve as a cover at the second end of the lock body. Furthermore, the code setting rings may be supported and axially fixed by the second closure part in the direction of the second end of the lock body. The assembly of the combination locking mechanism and in particular the correct arrangement of the code setting rings may thus take place outside the housing sleeve and without any space restrictions, whereupon, for the assembly of the chain lock or the lock body, only a plugging together or a pushing together of the closure parts into the housing sleeve and a fixing of the closure parts and of the chain connection part by the respective fastening pins is necessary.

Provision may be made that the bearing prolongation of the first closure part of the lock body forms a passage for introducing the bolt mandrel. The bearing prolongation may, for example, have the shape of a slit hollow cylinder, wherein the bolt mandrel may be configured to be introduced along the lock axis into the passage formed by the bearing prolongation. The bearing prolongation of the first closure part may have an opening, in particular a slit-like opening, which extends along the lock axis and through which at least one section of the bolt mandrel introduced may project radially outward with respect to an axis of rotation of the code setting rings. Due to such a projection of at least one section of the bolt mandrel from a passage formed by the bearing prolongation, a cooperation of this section with the code setting rings arranged around the bearing prolongation may be made possible to be able to lock the bolt to the lock body. For example, the bolt mandrel may have a plurality of elevated locking portions that extend radially outward with respect to an axis of rotation of the code setting rings through such an opening of the bearing prolongation and that may be engaged behind by respective blocking webs formed at an inner periphery of the code setting rings when the secret code is not set in order to prevent a pulling of the bolt or the bolt mandrel out of the lock body.

In some embodiments, the at least one first fastening pin may engage through the housing sleeve and through the first closure part of the lock body into the annular groove of the chain connection part. The first closure part may in particular be arranged within the housing sleeve such that the first fastening pin may engage from radially outside through the housing sleeve into the first closure part. The at least one first fastening pin may thus, in addition to supporting the chain connection part, also serve to fix the first closure part to the housing sleeve, wherein tensile forces transmitted via the chain connection part may be conducted past the first closure part to the stable housing sleeve.

In some embodiments, the first fastening pin(s) may be radially aligned with respect to the lock axis (i.e. the longitudinal axis of the fastening pin and the lock axis intersect). Alternatively or additionally, the second fastening pin(s) may be radially aligned with respect to the lock axis. Less lateral installation space is hereby required for the secure support of the respective fastening pin in the environment of the lock axis (in particular for the first closure part or the second closure part) than, for instance, on a tangential alignment of the respective fastening pin relative to the lock axis (i.e. when the longitudinal axis of the fastening pin and the lock axis cross without intersecting).

In some embodiments, the lock body may have, at the first end, two first fastening pins that engage into the annular groove of the chain connection part, wherein the two first fastening pins may be aligned coaxially to one another. The two first fastening pins may in particular engage through the housing sleeve into the annular groove of the chain connection part and may rotatably support the chain connection part at the first closure part. Tensile forces applied via the chain connection part may thus be conducted via both first fastening pins past the first closure part to the housing sleeve to be able to ensure the required tensile stability of the chain lock. Furthermore, the first fastening pins may engage through the housing sleeve and the first closure part of the lock body into the annular groove of the chain connection part such that the first closure part may also be fixed to the housing sleeve at both sides by the two first fastening pins.

Since the two first fastening pins may be arranged coaxially or diametrically opposite one another, the chain connection part may be fixedly fixed to the first closure part perpendicular to the lock axis, apart from a slight clearance. Accordingly, the chain connection part may in particular substantially be rotatably supported at the first closure part in a plane perpendicular to the lock axis or to a rotational axis of the code setting rings. The fixing of the chain connection part in this plane in particular also makes it possible to transmit any forces acting transversely to the lock axis via the two first fastening pins to the housing sleeve.

In some embodiments, the lock body may also have more than two—for example three or four—first fastening pins at the first end, in particular in a regular angular distribution with respect to the lock axis and/or in a radial alignment with respect to the lock axis.

In some embodiments, the second closure part of the lock body may have an introduction opening for the bolt mandrel. Alternatively or additionally thereto, the second closure part of the lock body may be annular. The second closure part may in particular close the housing sleeve at the second end of the lock body and may act as a cover to be able to protect the combination locking mechanism arranged within the housing sleeve, in particular when the bolt mandrel is introduced, from external influences. The introduction opening may in particular be formed coaxially and/or in alignment with a passage for introducing the bolt mandrel, the passage being formed by the already mentioned bearing prolongation of the first closure part. For example, the introduction opening may be arranged at the center of the second closure part and/or coaxially to an axis of rotation of the code setting rings or to the lock axis.

In some embodiments, the second closure part may be made from steel. A force flow occurring on a tensile load may be led from the chain connection part via the at least one first fastening pin, the housing sleeve, and the at least one second fastening pin to the second closure part at which the code setting rings may be supported to which a tensile load may be transmitted by the bolt mandrel introduced and locked into the lock body. To be able to ensure the required tensile stability, a stable design of the second closure part is consequently necessary, whereas the first closure part may generally be made from materials that are less stable and easier to form. The required tensile stability of the chain lock may be achieved by a design of the second closure part from steel, wherein the production of the second closure part from such a material, in particular in a simple annular design of the second closure part with only one introduction opening for the bolt mandrel, may take place without problem, in a fast and thereby inexpensive manner.

In some embodiments, the chain connection part and/or the bolt (in particular a further chain connection part of the bolt) may have a respective eyelet that is engaged through by a respective end member of the chain.

In some embodiments, the fastening section of the bolt may be formed in one part with the bolt mandrel.

In some embodiments, the bolt may have a further chain connection part that is rotatably supported at a fastening section of the bolt. The chain may be fixedly connected at respective ends to the chain connection part of the lock body and to the further chain connection part of the bolt, wherein the chain may be rotatable relative to the lock body by the rotatable support of the chain connection parts. Conversely, since the bolt also has a rotatable chain connection part, the lock body and in particular the housing sleeve with the code setting rings may be rotatable relative to the chain at both ends. When the bolt mandrel is introduced into the lock body, the bolt mandrel and/or the fastening section of the bolt may be fixed for rotation with the first closure part and/or the second closure part and, via the fastening pins, to the housing sleeve, wherein the bolt mandrel and the fastening section of the bolt may be rotatable relative to the chain due to the rotatable support of the further chain connection part.

Since the total lock body may be rotatable relative to the chain when the bolt mandrel is introduced, a particularly comfortable operation of the chain lock may be achieved. The bolt mandrel may in particular be introduced into the lock body for a locking in any desired orientation of the lock body, wherein the lock body may thereupon be rotated relative to the chain to enable a viewing without problem of the access window for adjusting a combination by means of the code setting rings.

In some embodiments, the bolt may have at least one third fastening pin that engages through the fastening section into an annular groove of the further chain connection part, in particular in a radial alignment with respect to the bolt axis. Due to the engagement of the at least one third fastening pin into the annular groove, it may in particular be achieved that the further chain connection part is rotatably supported at the fastening section of the bolt. Provision may further be made that the bolt comprises two third fastening pins that are aligned coaxially to one another. The further chain connection part may thereby be held at the fastening section of the bolt in a secure manner with respect to tensile forces, wherein the engagement of the two third fastening pins into the annular groove may enable a rotatable support of the further chain connection part on a reliable fixing along the lock axis.

In some embodiments, each of the plurality of code setting rings may have, at an inner periphery, a blocking web that extends in a peripheral direction and that is interrupted by a release recess, wherein the bolt mandrel has a number of elevated locking portions along the lock axis corresponding to the number of code setting rings, wherein the release recesses of the code setting rings may only be aligned with respect to the elevated locking portions of the bolt mandrel, and the bolt may thus be released for being detached from the lock body, when a secret code is set at the code setting rings. If the secret code is, in contrast, not set, the bolt may be locked to the lock body and secured against being detached from the lock body.

The elevated locking portions may in particular be arranged along the lock axis and in alignment with one another at the bolt mandrel, wherein at least one of the blocking webs of the code setting rings may be arranged in alignment with a respective associated elevated locking portion when the bolt mandrel is introduced into the lock body and the secret code is not set at the code setting rings. A movement of the bolt mandrel along the lock axis from the lock body may accordingly be blocked by the blocking web or the blocking webs that are oriented in alignment with the associated elevated locking portions. By setting the secret code at the code setting rings, the release recesses of the code setting rings may, in contrast, be arranged in alignment with one another such that the bolt may be released for being detached from the lock body and the elevated locking portions of the bolt mandrel may be guided through the release recesses of the code setting rings. For example, the elevated locking portions of the bolt mandrel may, as already explained, project radially outward through an opening, extending along the lock axis, of a bearing prolongation of the first closure part, which may form a passage for introducing the bolt mandrel into the lock body, in order to enable a locking of the bolt by a cooperation of the elevated locking portions with the blocking webs.

In some embodiments, provision may be made that each of the plurality of code setting rings is formed in multiple parts and has an outer marking ring and an inner tumbler ring that are fixed for rotation with one another in an operating state of the combination lock mechanism, wherein, in a secret code changing state of the combination lock mechanism, an angular position of the marking rings relative to the tumbler rings may be selectively adjustable to change the secret code.

For example, the respective tumbler rings and marking rings may be in form-fitted engagement with one another in the operating state of the combination locking mechanism such that a rotation of the marking rings may be transmitted to the tumbler rings. For this purpose, outer-side elevated coupling portions may, for example, be formed at the tumbler rings and may engage into respective coupling recesses formed at an inner periphery of the marking rings. The tumbler rings may in particular have, at inner peripheries, the already mentioned blocking webs having respective release recesses by which the bolt mandrel introduced into the lock body may be locked in the lock body and may be secured against a removal from the lock body when the secret code is not set.

To be able to selectively change the secret code, provision may, for example, be made that the tumbler rings are arranged axially offset with respect to the marking rings in the secret code changing state of the combination locking mechanism to dissolve the form-fitted engagement and to be able to enable a rotation of the marking rings relative to the respective associated tumbler ring. For this purpose, provision may, for example, be made that the tumbler rings, when the bolt is removed, are displaceable against the force of a spring by a compression force exerted at the second end of the lock body to dissolve the engagement between the marking rings and the tumbler rings. For this purpose, a user may, for example, directly transmit a force directed in the direction of the first end to the tumbler rings, for which purpose a setting element arranged at the second end may be provided, for example. Such a setting element may also be configured to convert a rotational movement into an axial movement such that a user may axially displace the tumbler rings by rotating the setting element. In addition, provision may be made that, on the reaching of the secret code changing state, the setting element latches in such that the user does not have to maintain the compression force during the disarranging of the secret code and may operate the code setting rings with both hands.

To change the secret code, the marking rings may be rotated in the secret code changing state while the tumbler rings remain in their position with mutually aligned release recesses. On a dissolving of the compression force, for example by releasing a setting element from a detent lock, the tumbler rings may be automatically returned by the spring and brought into engagement with the marking rings. In this state the release recesses of the blocking webs are still aligned with one another such that the combination now set at the code setting rings or at the marking rings indicates the new secret code at which an introduction or a removal of the bolt mandrel into or from the lock body is possible.

Alternatively to a compression force exerted at the second end of the lock body, provision may generally also be made to displace the tumbler rings axially with respect to the marking rings against a spring force by a tensile force exerted at the second end. Similarly, in some embodiments, it is possible to transfer the combination lock mechanism to the secret code changing state by a compression force or tensile force applied at the first end of the lock body.

BRIEF DESCRIPTION OF THE DRAWINGS

The present disclosure will be explained in the following purely by way of example with reference to an embodiment and to the drawings.

There are shown.

DETAILED DESCRIPTION

Figure 1:
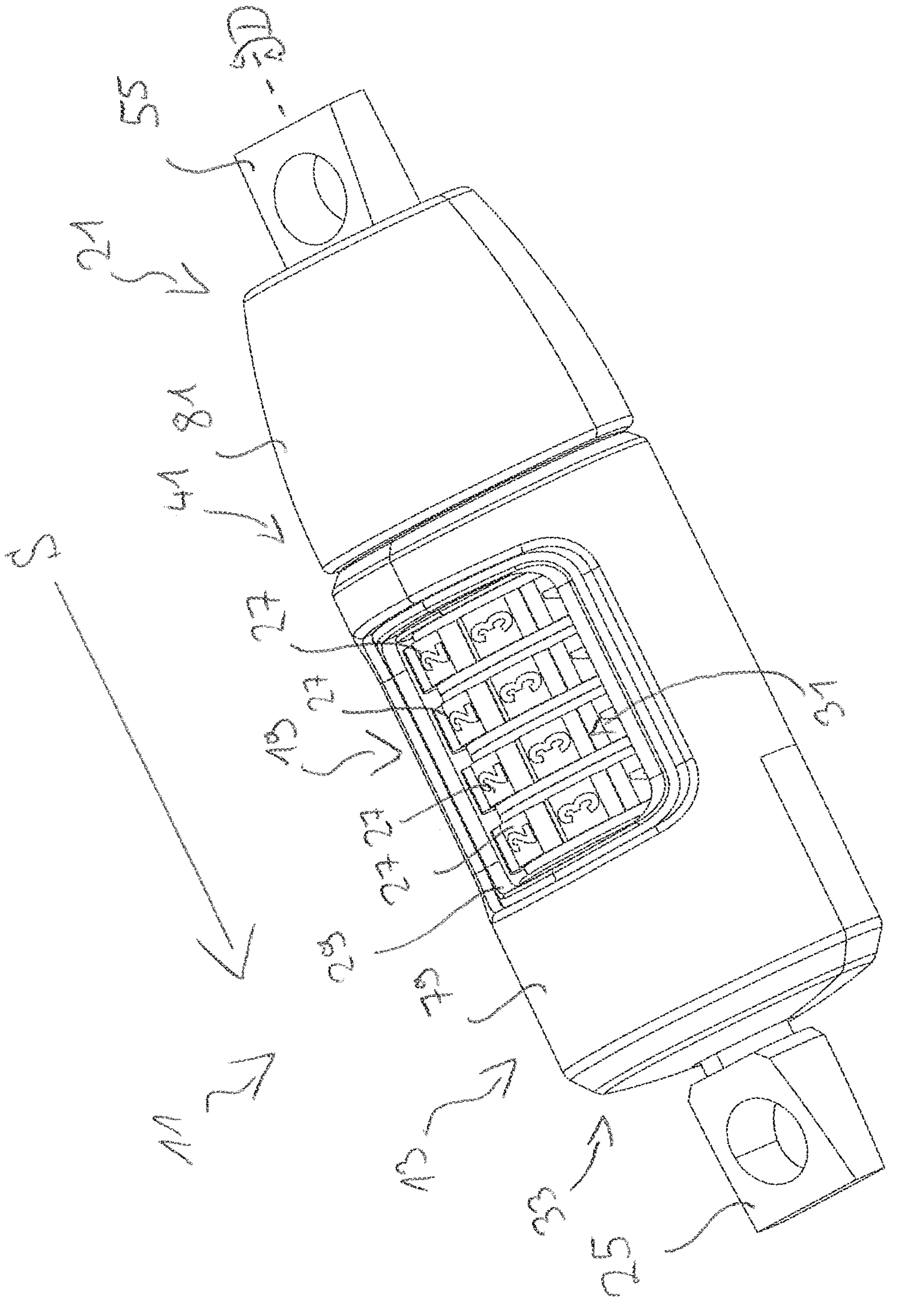
FIG. 1 is a perspective view of a chain lock with a combination locking mechanism.

FIG. 1 shows a chain lock 11 that extends along a lock axis S and that has a lock body 13 and a bolt 21 that is introduced into the lock body 13 and that may be selectively locked to the lock body 13 by a combination locking mechanism 19. For this purpose, the combination locking mechanism 19 has a plurality of code setting rings 27 that are rotatable about an axis of rotation D and that are accessible through an access window 31 for a manual rotation. A combination of four numbers that may be checked through the access window 31 may be set by the code setting rings 27. The bolt 21 may only be detached from the lock body 13 when the combination corresponds to a secret code, whereas the bolt 21 is locked to the lock body 13 when the secret code is not set.

Figure 2:
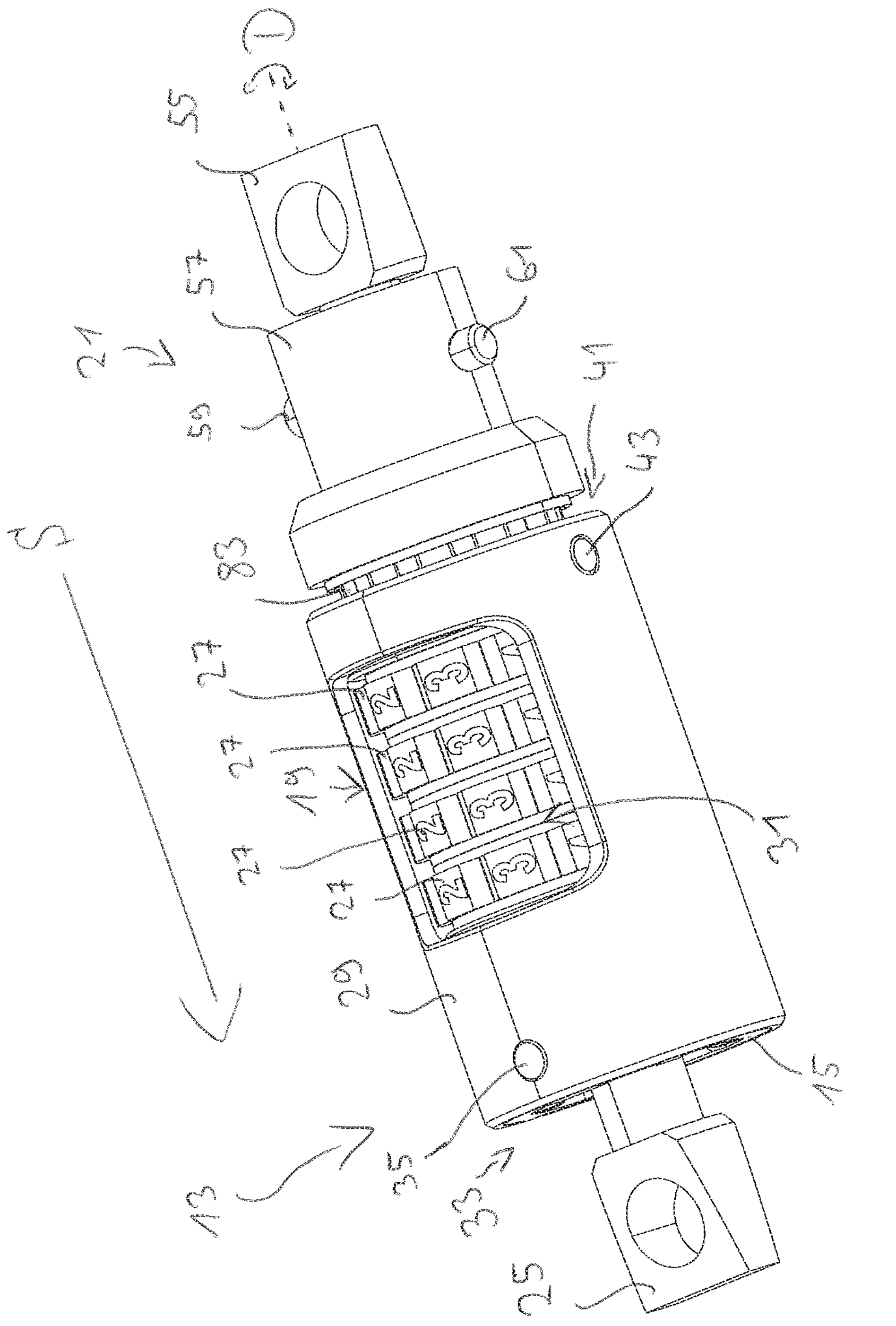
FIG. 2 is a perspective view of the chain lock with the cover removed.

A chain connection part 25 rotatably supported about the axis of rotation D is fastened to a first end 33 of the lock body 13. A second end 41 of the lock body 13 is associated with the bolt 21. The bolt 21 has a further chain connection part 55 that is likewise rotatably supported about the axis of rotation D at a fastening section 57 of the bolt 21 (cf. FIGS. 2 and 3). The chain connection parts 25 and 55 are provided to be connected to one another via a chain, not shown, for example a link chain or a wire-like chain, such that the chain connection part 25 of the lock body 13 is permanently connected to the bolt 21 via the chain. This makes it possible to form a loop from the chain lock 11 by introducing the bolt 21 into the lock body 13 in order, for example, to connect a two-wheeler to a stationary object by such a loop and to secure the two-wheeler against an unauthorized removal when the bolt 21 is locked. The chain connection part 25 and the bolt 21 are aligned coaxially to one another in the locked state of the bolt 21 (cf. FIGS. 1 and 2).

Figure 3:
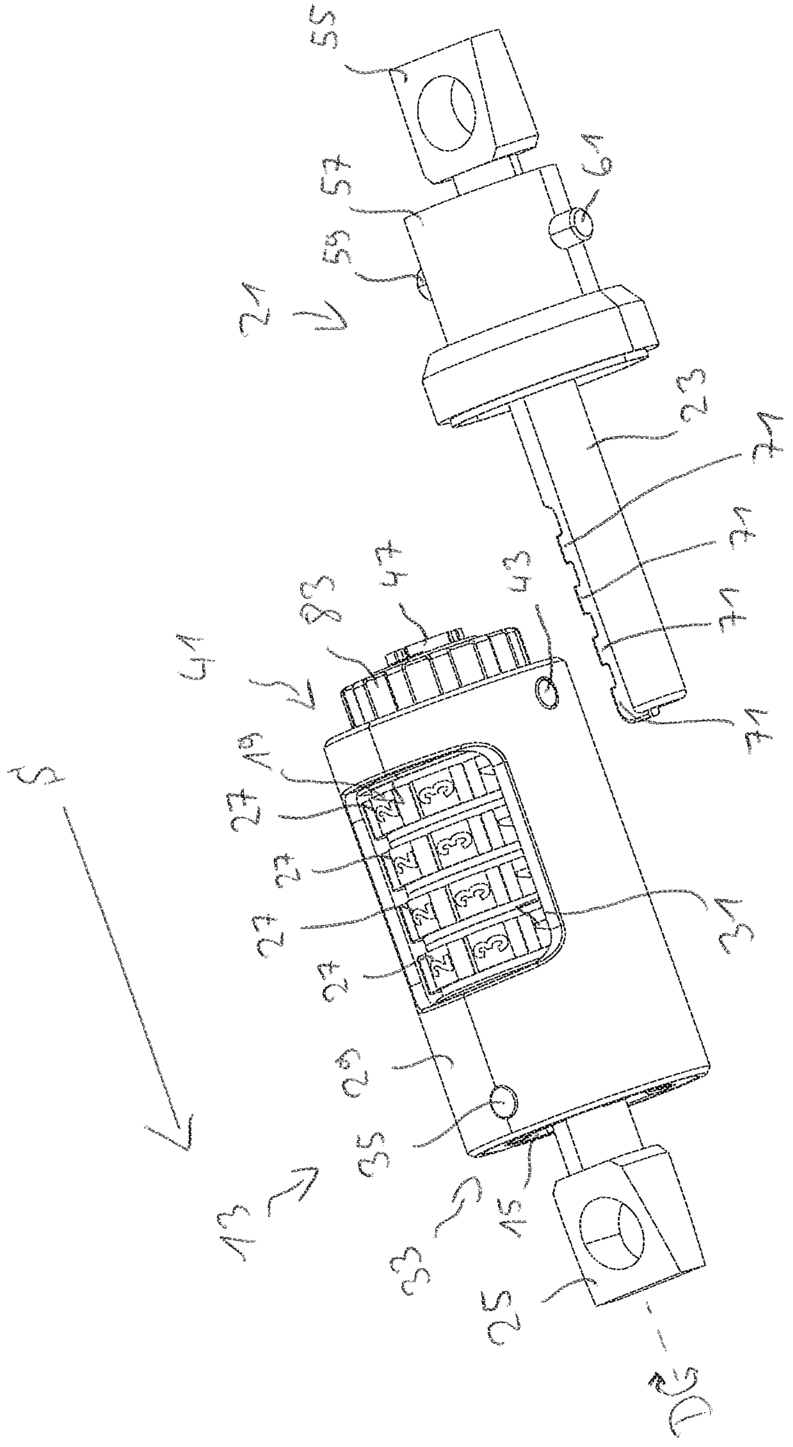
FIG. 3 is a perspective view of the chain lock with the cover removed and the bolt released from a lock body of the chain lock.

FIG. 3 shows the bolt 21 detached from the lock body 13. The bolt 21 has a bolt mandrel 23 that extends along the lock axis S and that may be introduced into the lock body 13 and may be locked there. For this purpose, the bolt mandrel 23 has a plurality of elevated locking portions 71 that are configured to cooperate with the code setting rings 27 to be able to lock the bolt 21 when the bolt mandrel 23 is introduced into the lock body 13.

As FIG. 1 further shows, the chain lock 11 has a first cover part 79, which surrounds the lock body 13, and a second cover part 81 that surrounds the bolt 21 and that may be detached together with the bolt 21 from the lock body 13 (cf. FIG. 3). While the cover parts 79 and 81 may in particular serve as a decorative cover and for a comfortable handling of the chain lock 11, the lock body 13 has a housing sleeve 29 which is surrounded by the first cover part 79 and within which the combination locking mechanism 19 and in particular the code setting rings 27 are received in order to protect the combination locking mechanism 19 against external influences and in particular against break-open attempts (cf. FIGS. 2 to 5B). The housing sleeve 29 may be made from a stable material and, for example, from steel to be able to achieve a reliable protection of the combination locking mechanism 19 with respect to force effects and in particular a high load capacity of the chain lock 11 with respect to tensile loads that are applied via the chain connection parts 25 and 55 during a break-open attempt.

Figure 4A:
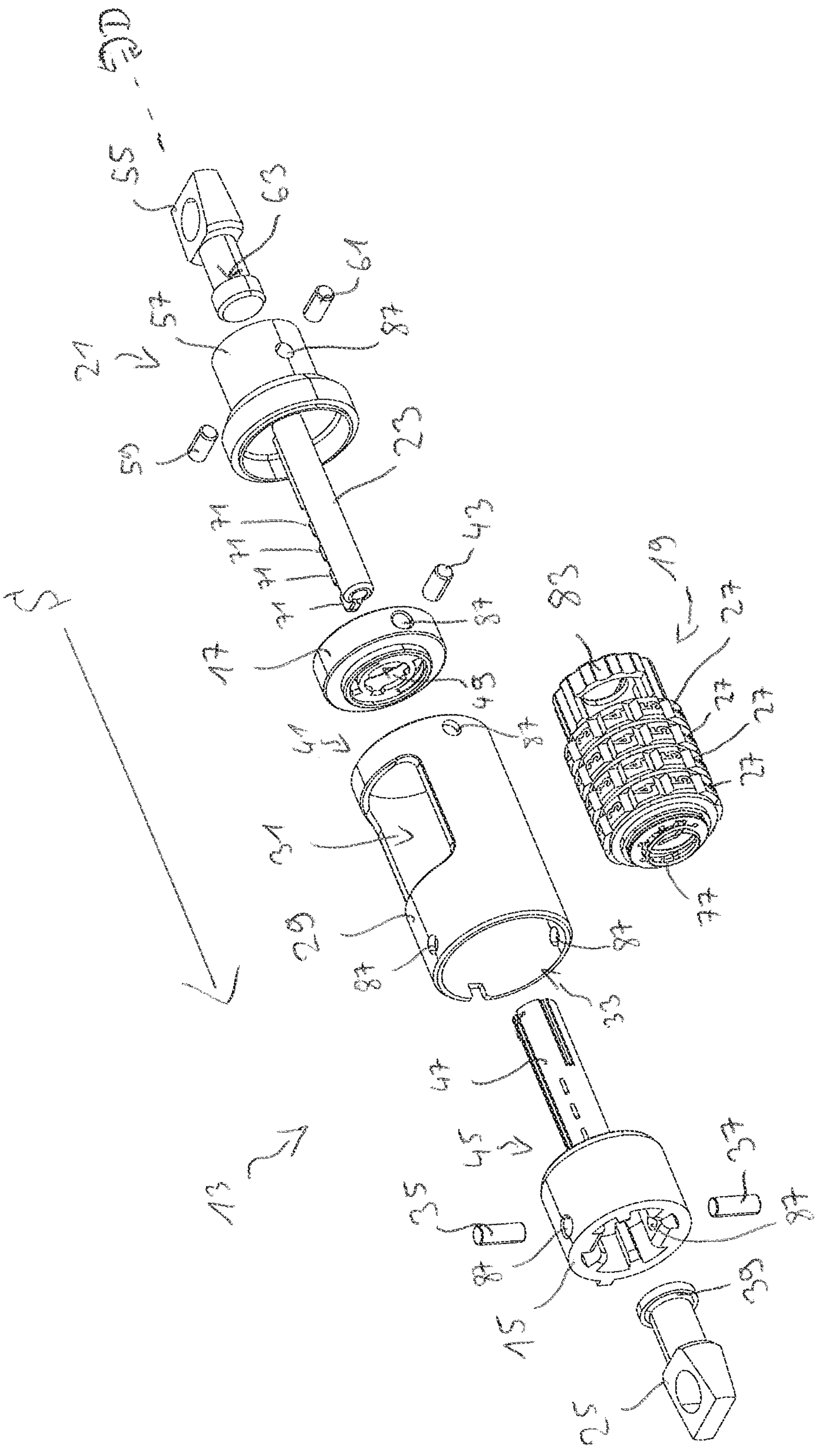
FIG. 4A is a respective perspective exploded representation of the chain lock with the cover removed to illustrate the components of the chain lock.
Figure 4B:
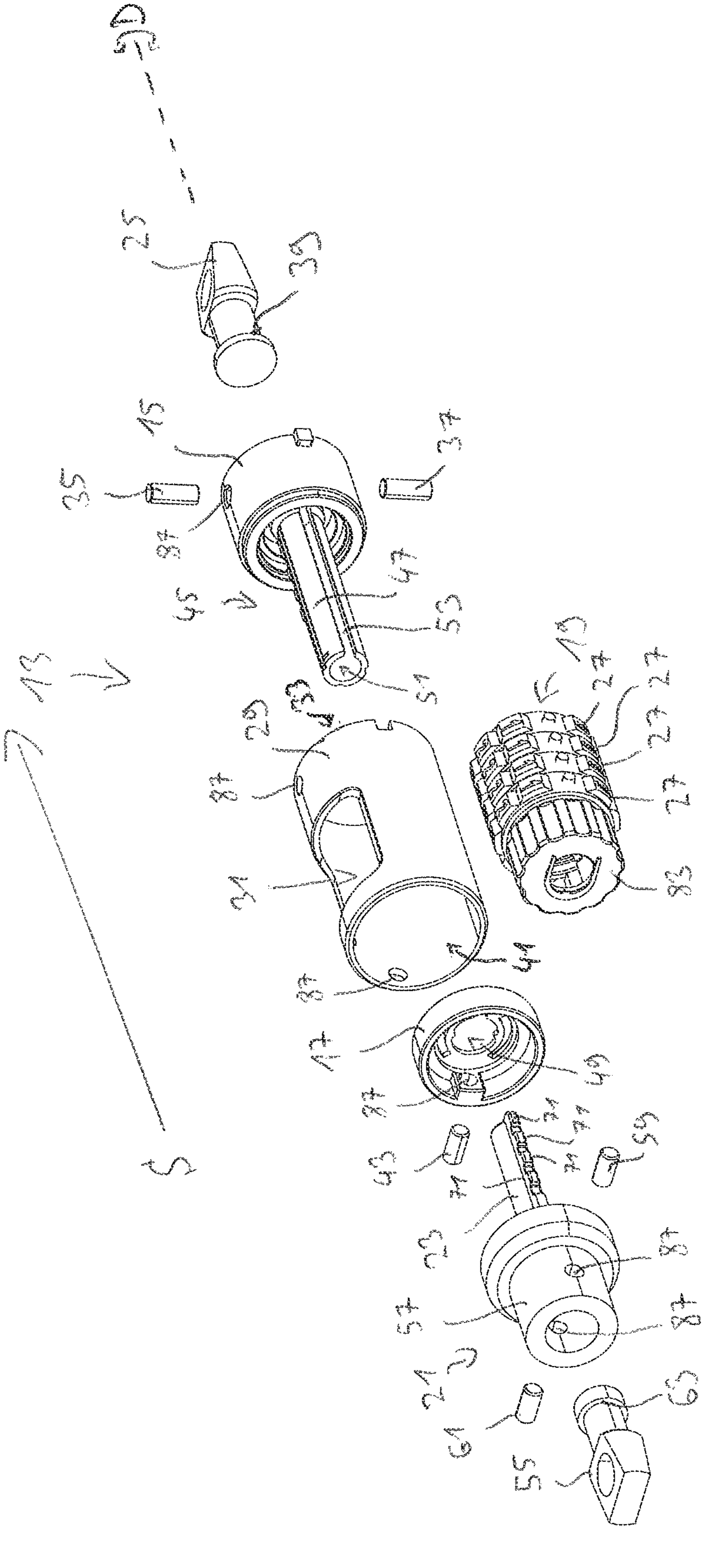
FIG. 4B is a respective perspective exploded representation of the chain lock with the cover removed to illustrate the components of the chain lock.

As, for example, the exploded representations of FIGS. 4A and 4B show, the housing sleeve 29 is hollow cylindrical and, at the lateral surfaces, only has the access window 31 and a plurality of fastening openings 87 for fixing a first closure part 15 and a second closure part 17, as will be explained in more detail in the following. Due to this simple design, the housing sleeve 29 may be produced without problem, quickly and inexpensively from strong materials, for example from steel, to be able to achieve the required load capacity of the chain lock 11.

The first closure part 15 and the second closure part 17 are insertable into the housing sleeve 29 to close the lock body 13 at the first end 33 or the second end 41 in an axial direction and to fix the locking mechanism 19 in the housing sleeve 29. The first closure part 15 forms a base body 45 of the lock body 13 and has a bearing prolongation 47 which extends along the lock axis S and at which the code setting rings 27 of the locking mechanism 19 are supported in the assembled state of the chain lock 11 (cf. also FIG. 7A). This may make it possible to first arrange the code setting rings 27 at the bearing prolongation 47 of the first closure part 15 during an assembly of the chain lock 11, and thereupon to insert them together with the first closure part 15 axially with respect to the lock axis S through the opening at the first end 33 of the lock body 13 into the housing sleeve 29. The relatively small-part and multi-part combination locking mechanism 19 may thus be assembled outside the housing sleeve 29 such that this part of the assembly may take place without any space restriction and the total combination locking mechanism 19 may be inserted into the housing sleeve 29 in one step.

In addition to the support of the code setting rings 27, the bearing prolongation 47 also serves to form a passage 51 into which the bolt mandrel 23 may be introduced for a locking into the lock body 13. The bearing prolongation 47 extends through the housing sleeve 29 in the direction of the second closure part 17 that has an introduction opening 49 through which the bolt mandrel 23 may be introduced into the lock body 13 (cf. also FIG. 5A). A slit 53 extending along the lock axis S is formed at the bearing prolongation 47, through which slit 53 the elevated locking portions 71 of the bolt mandrel 23 engage when the bolt mandrel 23 is introduced into the lock body 13 in order to enable a locking of the bolt 21 by the code setting rings 27.

To fasten the first closure part 15 to the housing sleeve 29, the lock body 13 has a first fastening pin 35 that engages through a fastening opening 87 of the housing sleeve 29 and a fastening opening 87 of the first closure part 15 in the assembled state of the chain lock 11. The lock body 13 further comprises a further first fastening pin 37 that is aligned coaxially to the first fastening pin 35 and that so-to-say engages through respective fastening openings 87 of the housing sleeve 29 and of the first closure part 15 (cf. also FIG. 5B).

Figure 5A:
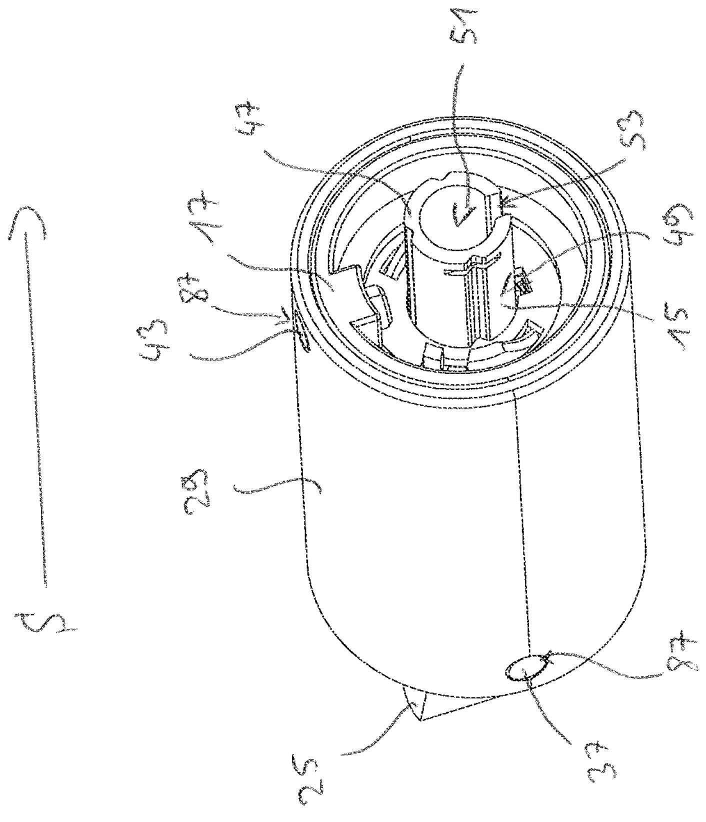
FIG. 5A is a respective perspective view of a housing sleeve of the lock body with a first closure part fixed thereto, with a chain connection part, and with a second closure part fixed to the housing sleeve.
Figure 5B:
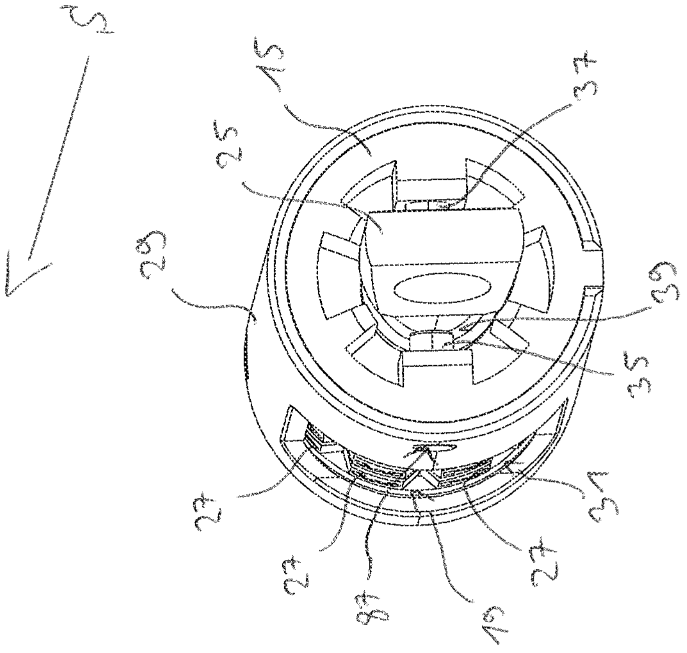
FIG. 5B is a respective perspective view of a housing sleeve of the lock body with a first closure part fixed thereto, with a chain connection part, and with a second closure part fixed to the housing sleeve.

The two first fastening pins 35 and 37 engage radially through the housing sleeve 29 into an annular groove 39 formed at the chain connection part 25 such that the chain connection part 25 is rotatably supported at the first closure part 15 (cf. also FIG. 5B). The first fastening pins 35 and 37 thus serve, on the one hand, to axially fix the first closure part 15 to or in the housing sleeve 29 and, on the other hand, to rotatably support the chain connection part 25 at the first closure part 15. Due to this rotatable support of the chain connection part 25, the chain connection part 25 may be rotated about the axis of rotation D of the code setting rings 27 relative to the first closure part 15 and to the housing sleeve 29. Accordingly, the access window 31 may, for example, always be rotated relative to the chain fastened to the chain connection part 25 to be able to set a combination by the code setting rings 27 or to be able to check a set combination.

While the first closure part 15 has a relatively complex shape as the base body 45 of the lock body 13, the second closure part 17 is formed in an annular shape with the introduction opening 49 for introducing the bolt 21 or the bolt mandrel 23 into the lock body 13 and thus has a very simple geometric shape. In the assembled state of the chain lock 11, the second closure part 17 is arranged at the second end 41 of the lock body 13 within the housing sleeve 29 and so-to-say forms a cover of the housing sleeve 29 at which the code setting rings 27 lined up on the bearing prolongation 47 are supported. To fix the second closure part 17 to the housing sleeve 29, a second fastening pin 43 is provided that engages radially through fastening openings 87 of the housing sleeve 29 and of the second closure part 17 (cf. also FIG. 5B).

Since the chain connection part 25 is connected to the housing sleeve 29 via the two first fastening pins 35 and 37, a tensile force applied via the chain connection part may be conducted past the first closure part 15 via the fastening pins 35 and 37 directly to the housing sleeve 29. A force flow from the chain connection part 25 at the lock body side leads via the two first fastening pins 35 and 37, the housing sleeve 29, and the second fastening pin 43 to the second closure part 17 that supports the code setting rings 27 at which the bolt mandrel 23 engages on a development of a tensile force and when the secret code is not set. Due to this conducting of the force flow past the first closure part 15, the latter may generally be less loadable with respect to tensile forces, wherein the necessary tensile stability of the chain lock 11 or of the lock body 13 may be ensured by a stable design of the housing sleeve 29 and of the second closure part 17 and of the fastening pins 35, 37 and 43.

This in particular makes it possible to manufacture the relatively complex first closure part 15, which forms a base body 45, from a zinc die casting, while, due to these simple geometric shapes, the hollow cylindrical housing sleeve 29 and the annular second closure part 17 may be manufactured without problem from stable materials that are necessary for a sufficient tensile stability, for example from steel. All the parts of the lock body 13, and in particular also the complex first closure part 15, may thus be manufactured very quickly such that the manufacture of the chain lock 11 may be simplified and accelerated overall and may thereby take place inexpensively without this being accompanied by a loss of stability. In addition, the production of the first closure part 15 from a zinc die casting enables an uncomplicated and precise reproducibility of the shape of the closure part 15 for a large number of chain locks 11.

To further improve the flexibility of the use of the chain lock 11, the further chain connection part 55, via which the bolt 21 may be connected to the chain connection part 25 of the lock body 13 by a chain that is not shown, is also rotatably supported about the axis of rotation D at the bolt 21 and thus relative to the lock body 13 or the housing sleeve 29. For this purpose, the bolt 21 has a fastening section 57 having two fastening openings 87 through which two third fastening pins 59 and 61 engage radially into an annular groove 63 of the chain connection part 55 to rotatably support the chain connection part 55 at the fastening section 57. The lock body 13 and the bolt 21 fastened thereto may thus be rotated with respect to both chain connection parts 25 and 55 such that the access window 31 may always be rotated into an orientation desired for operating the code setting rings 27.

Figure 6A:
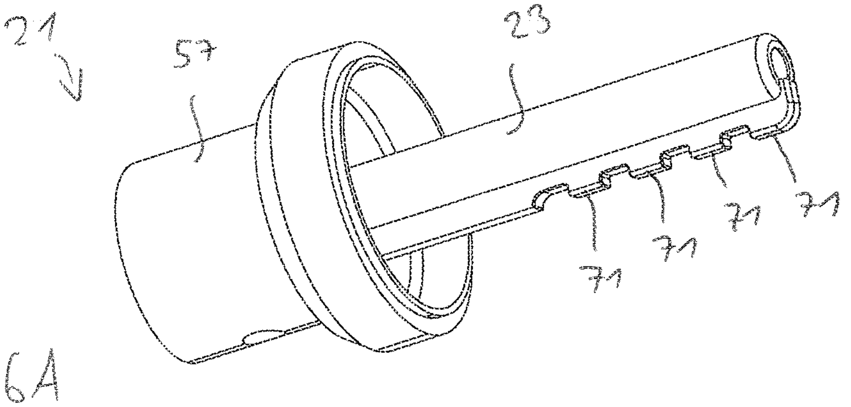
FIG. 6A is a perspective view of the bolt.
Figure 6B:
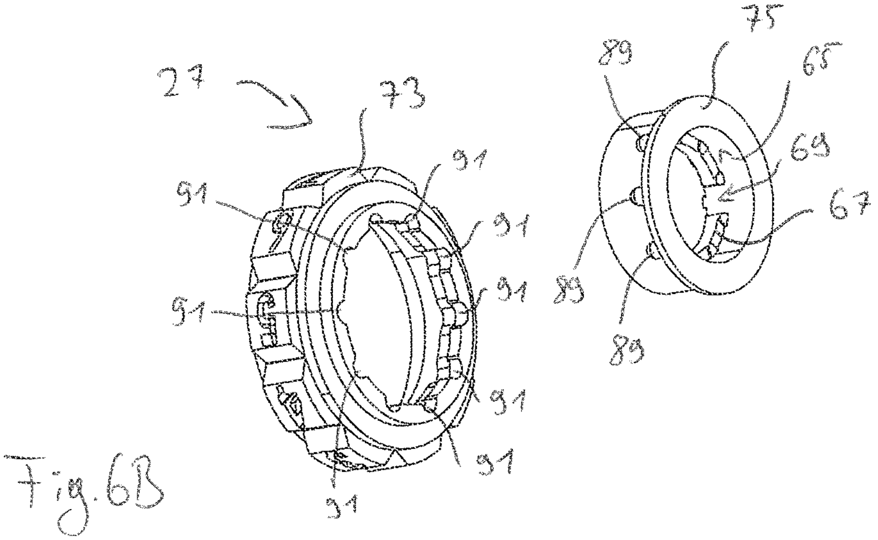
FIG. 6B is a perspective view of a code setting ring with a marking ring and a tumbler ring for locking the bolt introduced into the lock body.
Figure 6C:
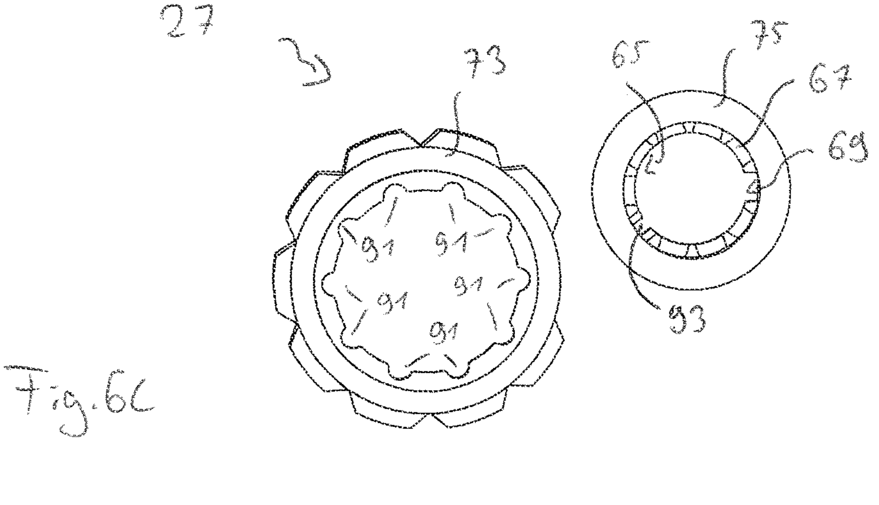
FIG. 6C is a front view of the code setting ring with the marking ring and the tumbler ring for locking the bolt introduced into the lock body.

FIGS. 6A to 6C in particular illustrate the cooperation of the code setting rings 27 with the bolt mandrel 23 to be able to selectively lock the bolt 21 to the lock body 13. As FIGS. 6B and 6C show, the code setting rings 27 are formed in multiple parts and have a respective outer marking ring 73 and an inner tumbler ring 75 that is fixed for rotation with the marking ring 73 in an operating state of the combination locking mechanism 19. For this purpose, a plurality of elevated coupling portions 89 are formed at respective outer peripheries of the tumbler rings 75 and engage into coupling recesses 91 formed at inner peripheries of the marking rings 73 such that the tumbler rings 75 are taken along on a manual rotation of the marking rings 73.

At an inner periphery 65, the tumbler rings 75 have respective blocking webs 67 that are interrupted by a respective release recess 69. The release recesses 69 of the tumbler rings 75 may be oriented in alignment with one another by setting the secret code at the code setting rings 27 in order to allow the elevated locking portions 71 of the bolt mandrel 23, which is introduced into the lock body 13 or into the passage 51, to pass during a removal of the bolt mandrel 23 from the lock body 13 (cf. also FIGS. 3 and 6A). If the secret code is, in contrast, not set at the code setting rings 27, at least one of the blocking webs 67 of the tumbler rings 75 is arranged in alignment with the associated elevated locking portion 71 of the bolt mandrel 23. When the secret code is not set, a pulling of the bolt mandrel 23 out of the lock body 13 is therefore prevented by the cooperation of the respective elevated locking portion 71 with the associated blocking web 67 such that the bolt 21 is locked to the lock body 13.

Figure 7A:
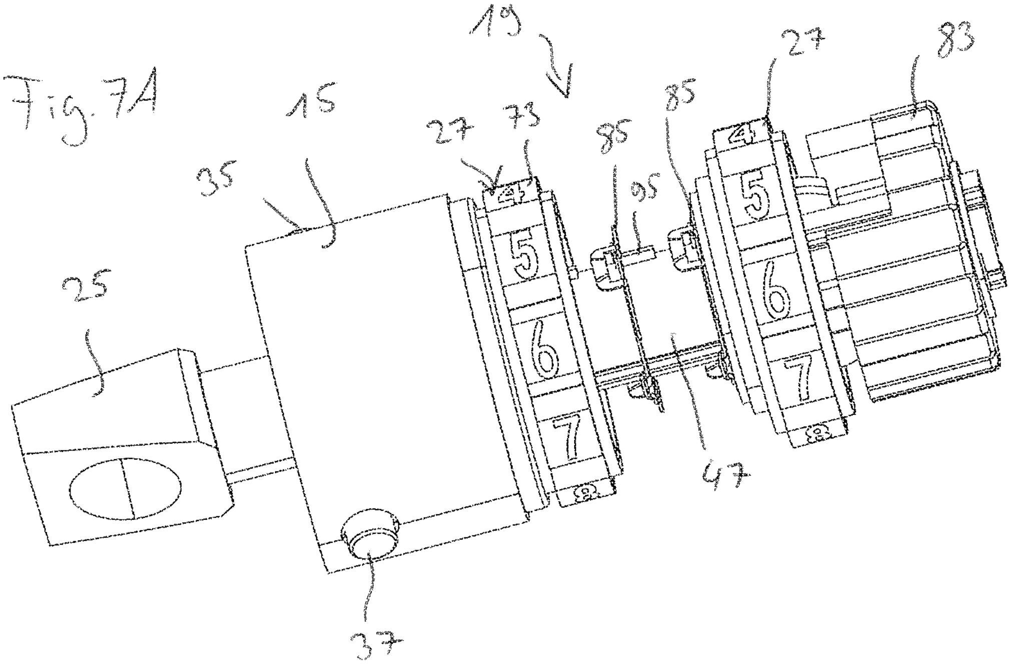
FIG. 7A is a perspective view of the code setting rings supported at the first closure part.

As FIG. 7A shows, separating disks 85 are arranged between two code setting rings 27, which are sequentially supported at the bearing prolongation 47 of the first closure part 15, and are rotationally fixedly held at the bearing prolongation 47 by respective elevated blocking portions 95 formed at the first closure part 15. These separating disks 85 in particular serve to prevent a co-rotation, for instance a friction-induced co-rotation, of adjacent code setting rings 27 on the rotation of the code setting rings 27. In addition, the separating disks 85 make it possible to selectively change the secret code.

Figure 7B:
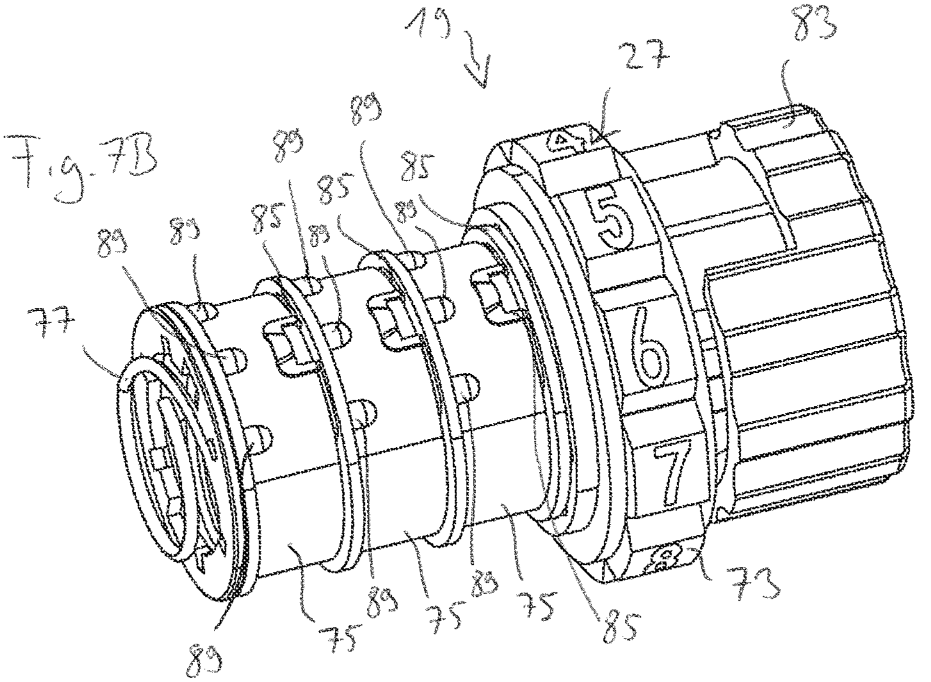
FIG. 7B is a perspective view of the code setting rings with partly removed marking rings to illustrate a possibility of disarranging a secret code.

As FIG. 7B shows, the tumbler rings 75 are supported at the first closure part 15 via a spring 77 in the direction of the first end 33 of the lock body 13. To be able to change the secret code, the combination locking mechanism 19 has a setting element 83 which is accessible when the bolt 21 is removed and by which a compression force may be applied to the separating disks 85 and, via the separating disks 85, to the tumbler rings 75. For this purpose, the setting element 83 may be configured to convert a rotation into an axial movement such that a user may transmit an axial force to the tumbler rings 75 by rotating the setting element.

Due to the development of such a compression force, the tumbler rings 75 may be moved axially relative to the marking rings 73 against the force of the spring 77 such that the elevated coupling portions 89 may be brought out of engagement with the coupling recesses 91 and the rotationally fixed coupling between the marking rings 73 and the tumbler rings 75 may be dissolved. In this secret code changing state of the combination locking mechanism 19, the marking rings 73 may be rotated relative to the tumbler rings 75 to set a new secret code, wherein, on a dissolving of the compression force exerted via the setting element 83, the tumbler rings 75 may automatically come back into engagement and may enter into a rotationally fixed coupling with the marking rings 73 due to the force of the spring 77. As a result, the release recesses 69 are still arranged in alignment with one another such that the key combination now set at the code setting rings 27 represents the new secret code.

To reliably prevent an unwanted co-rotation of the tumbler rings 75 during a setting of the new secret code, the tumbler rings 75 further have, in addition to the release recesses 69, a respective blocking recess 93 that comes into engagement with the elevated blocking portions 95, which are formed at the bearing prolongation 47 of the first closure part 15, after the axial displacement of the tumbler rings 75. In the operating state of the combination locking mechanism 19, the blocking webs 67 are, in contrast, arranged in respective intermediate spaces between two elevated blocking portions 95 to enable a rotation of the tumbler rings 75 relative to the bearing prolongation 47.

The chain lock 11 thus enables a simple manufacture and assembly in that in particular the complex first closure part 15 forming a base body 45 may, for example, be made from a zinc die casting since the required tensile stability may be ensured by conducting tensile forces via the two first fastening pins 35 and 37 to the housing sleeve 29 and via the second fastening pin 43 to the second closure part 17. Due to the simple shape of the housing sleeve 29 as a hollow cylinder with only a few openings, the fastening openings 87 and the access window 31 and due to the simple shape of the second closure part 17 as an annular cover of the housing sleeve 29 with the introduction opening 49, these parts may be produced without problem from stable materials, for example from steel. The chain lock 11 may thereby be produced in an overall simple and inexpensive manner without this simplified manufacture being accompanied by a loss of stability or security.

REFERENCE NUMERAL LIST

11 chain lock
13 lock body
15 first closure part
17 second closure part
19 combination locking mechanism
21 bolt
23 bolt mandrel
25 chain connection part
27 code setting ring
29 housing sleeve
31 access window
33 first end of the lock body

35 first fastening pin
37 further first fastening pin
39 annular groove of the chain connection part
41 second end of the lock body
43 second fastening pin
45 base body
47 bearing prolongation
49 introduction opening
51 passage
53 slit
55 further chain connection part
57 fastening section
59 third fastening pin
61 further third fastening pin
63 annular groove of the further chain connection part
65 inner periphery
67 blocking web
69 release recess
71 elevated locking portion
73 marking ring
75 tumbler ring
77 spring
79 first cover part
81 second cover part
83 setting element
85 separating disk
87 fastening opening
89 elevated coupling portion
91 coupling recess
93 blocking recess
95 elevated blocking portion
D axis of rotation
S key axis

The invention claimed is:

1. A chain lock comprising a lock body, which has a first closure part, a second closure part, and a combination locking mechanism that is aligned along a lock axis, and a bolt that has a bolt mandrel, which can be introduced into the lock body, and that can be selectively locked to the lock body by the combination locking mechanism, wherein the lock body has a chain connection part that is permanently connected to the bolt via a chain, wherein the chain connection part and the bolt are aligned coaxially to one another in a locked state of the bolt, wherein the combination locking mechanism comprises a plurality of rotatable code setting rings that are arranged between the first closure part and the second closure part of the lock body, wherein the lock body comprises a housing sleeve that has an access window via which the code setting rings are accessible for a manual rotation, wherein the lock body has, at a first end associated with the chain connection part, at least one first fastening pin that engages through the housing sleeve into an annular groove of the chain connection part such that the chain connection part is rotatably supported at the housing sleeve, and wherein the lock body has, at a second end associated with the bolt, at least one second fastening pin that engages through the housing sleeve into the second closure part of the lock body and that fixes the second closure part to the housing sleeve.

2. The chain lock in accordance with claim 1, wherein the housing sleeve has a cylindrical shape.

3. The chain lock in accordance with claim 1, wherein the housing sleeve is made from steel, and wherein the first closure part of the lock body is made from a zinc die casting.

4. The chain lock in accordance with claim 1, wherein the first closure part of the lock body forms a base body that has a bearing prolongation which is aligned along a lock axis and at which the code setting rings are rotatably supported.

5. The chain lock in accordance with claim 1, wherein the at least one first fastening pin engages through the housing sleeve and through the first closure part of the lock body into the annular groove of the chain connection part.

6. The chain lock in accordance with claim 1, wherein at least one of the at least one first fastening pin or the at least one second fastening pin is radially aligned with respect to the lock axis.

7. The chain lock in accordance with claim 1, wherein the lock body has, at the first end, two first fastening pins that engage into the annular groove of the chain connection part, wherein the two first fastening pins are aligned coaxially to one another.

8. The chain lock in accordance with claim 1, wherein the second closure part of the lock body is annular and has an introduction opening for the bolt mandrel.

9. The chain lock in accordance with claim 1, wherein the second closure part is made from steel.

10. The chain lock in accordance with claim 1, wherein the bolt has a further chain connection part that is rotatably supported at a fastening section of the bolt.

11. The chain lock in accordance with claim 10, wherein the bolt has at least one third fastening pin that engages through the fastening section into an annular groove of the further chain connection part.

12. The chain lock in accordance with claim 1, wherein each of the plurality of code setting rings has, at an inner periphery, a blocking web that extends in a peripheral direction and that is interrupted by a release recess, wherein the bolt mandrel has a number of elevated locking portions along the lock axis corresponding to the number of code setting rings, and wherein the release recesses of the code setting rings are only aligned with respect to the elevated locking portions of the bolt mandrel, and the bolt is thus released for being detached from the lock body, when a secret code is set at the code setting rings.

13. The chain lock in accordance with claim 12, wherein each of the plurality of code setting rings is formed in multiple parts and has an outer marking ring and an inner tumbler ring that are rotationally fixedly connected to one another in an operating state of the combination locking mechanism, wherein, in a lock secret changing state of the combination locking mechanism, an angular position of the marking rings relative to the tumbler rings is selectively adjustable to change the secret code.

14. The chain lock in accordance with claim 1, wherein the at least one first fastening pin engages through the housing sleeve into the annular groove of the chain connection part such that the chain connection part is rotatably supported about the lock axis at the housing sleeve.

* * * * *